No. 607,024. Patented July 12, 1898.
C. B. DURFEE & F. M. WILLIAMS.
BICYCLE HOLDER.
(Application filed May 9, 1896.)
(No Model.)
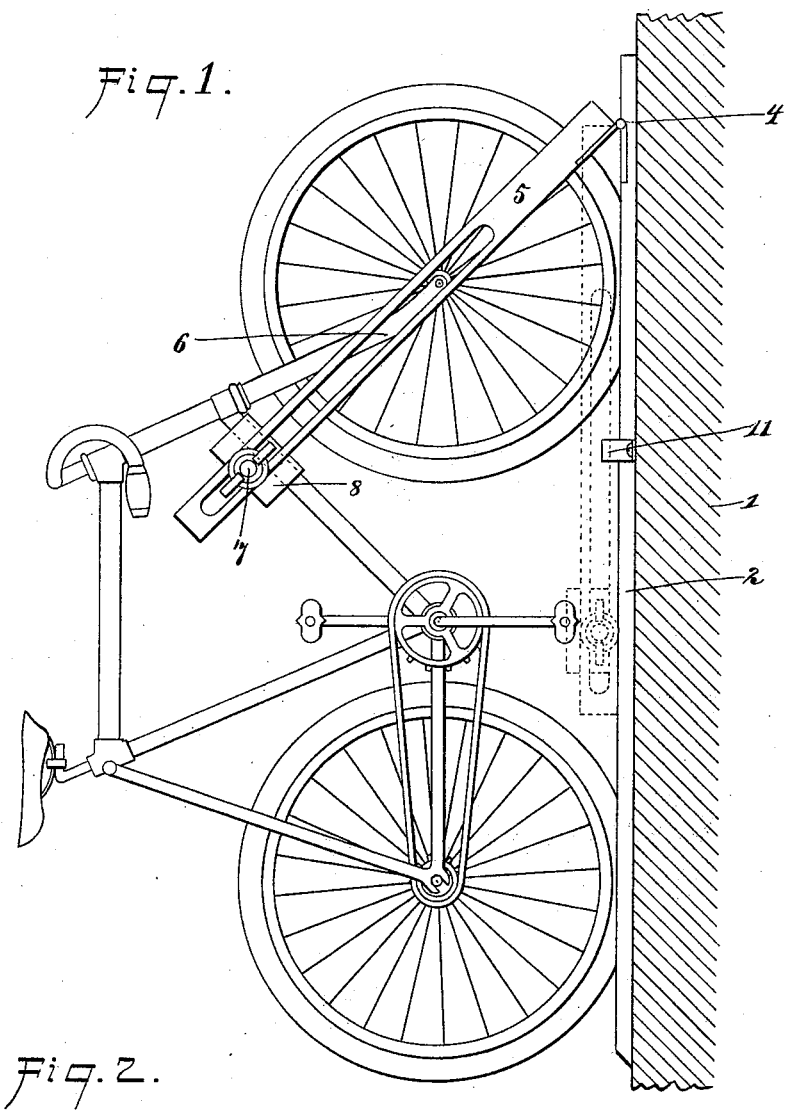
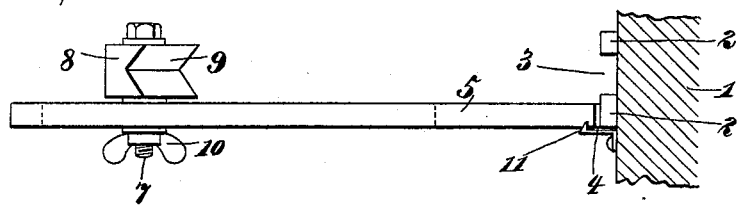
WITNESSES:
Henry A. C. Hellyer.
J. S. Barlinger
INVENTORS
C. B. Durfee
F. M. Williams
BY
ATTORNEYS.

UNITED STATES PATENT OFFICE.

CHARLES B. DURFEE AND FRANK M. WILLIAMS, OF BELLEVILLE, NEW YORK; SAID DURFEE ASSIGNOR TO SAID WILLIAMS; SAID WILLIAMS ASSIGNOR OF ONE-HALF TO DAVID A. BROWN, OF WOODBRIDGE, NEW JERSEY.

BICYCLE-HOLDER.

SPECIFICATION forming part of Letters Patent No. 607,024, dated July 12, 1898.

Application filed May 9, 1896. Serial No. 590,840. (No model.)

*To all whom it may concern:*

Be it known that we, CHARLES BRADFORD DURFEE and FRANK MARTIN WILLIAMS, of Belleville, in the county of Jefferson and State of New York, have invented a new and Improved Bicycle-Holder, of which the following is a full, clear, and exact description.

This invention relates to certain improvements in holders or supports for bicycles and the like, and has for its object to provide a device of this character of a simple and inexpensive nature which shall be adapted to firmly and securely support a bicycle against the wall or side of a building, baggage-car, or the like, the support being so constructed and arranged as to be adapted to fold in a compact manner when the bicycle is removed, whereby economy of space is effected.

The invention contemplates certain novel features of construction, combination, and arrangement of the various parts of the improved bicycle-holder, whereby certain important advantages are attained and the device is made simpler, cheaper, and otherwise better adapted and more convenient for use than various other similar devices heretofore employed, all as will be hereinafter fully set forth.

The novel features of the invention will be pointed out in the appended claims.

Reference is to be had to the accompanying drawings, forming a part of this specification, in which similar characters of reference indicate corresponding parts in both views.

Figure 1 is a side view showing the holder in use; and Fig. 2 is a plan view of the holder, the arm thereof being shown in an extended position.

In the views, 1 indicates the wall of a car or other surface whereon the holder is mounted, and 2 2 indicate strips of wood or other material secured on said wall and forming between them a space or recess 3, adapted to receive the treads of the bicycle-wheels, as will be readily understood, these strips forming stops to prevent lateral movement of the wheels when engaged in said space or recess.

At one side of the space or recess 3, between the strips 2, is hinged, as indicated at 4, an arm 5, adapted to fold down flush, when not in use, against the adjacent strip 2, as indicated in dotted lines in Fig. 1. The arm 5 is longitudinally slotted at its outer end, as indicated at 6, and in the slot 6 is arranged to slide a screw or pin 7, carrying a pivoted block 8 at one side of the arm, which block is adapted to be adjustably secured in place on the arm after having been moved along the same to the required position by means of a nut 10, screwing on the screw or pin 7. The pivoted block 8 is provided in one side with an angular recess 9, adapted to engage under and receive the lower diagonal brace-bar of the frame or an equivalent part of the bicycle to be supported, so as to hold the bicycle raised above the floor, with its wheel-treads engaging the space 3 between the strips 2.

In operation when it is desired to support a bicycle by means of our improved holder the bicycle is lifted up, so that its rear wheel stands above the floor and the wheel-treads are engaged between the strips 2, the arm 5 being swung out away from the side of the car or wall whereon it is pivotally mounted, and the block 8, carried on the arm, being engaged under some portion of the bicycle-frame, preferably the diagonal brace-bar thereof. The pivotal attachment of the block 8 to the arm permits it to be turned so as to engage any desired portion of the bicycle-frame, and by reason of the slotted connection between the block 8 and the arm 5, whereon it is carried, it will be seen that said block may be adjusted along the arm so as to stand in any desired position.

When the arm 5 is not required for use, it may be folded down against the adjacent strip 2, as indicated in dotted lines in Fig. 1, and when so folded said arm will be securely held against the strip by means of a spring-catch or equivalent device 11, secured on the car or wall 1, as shown in the drawings. When the arm is to be folded against the car-wall, the block 8 carried thereon will be swung pivotally, so as to permit the arm to fit flush against the adjacent strip 2, as shown in dotted lines in Fig. 1.

The improved holder, constructed as above described, is extremely simple and inexpensive and is well adapted for the purposes for which it is designed, since it permits the bicycle to be firmly and securely held against the wall or other surface clear of the floor and out of the way, so that the holder is made especially well adapted for use in baggage-cars and storerooms where it is desired to economize space as much as possible. Furthermore, the holder is so constructed as to be adapted to fold compactly out of the way when not required for use.

It will be apparent from the above description that the invention is susceptible of some modification without material departure from its principles and spirit, and for this reason we do not wish to be understood as limiting ourselves to the exact form and arrangement of the various parts herein set forth. For example, if desired, the arm may be constructed in sections telescoping or sliding on each other.

Having thus described our invention, we claim as new and desire to secure by Letters Patent—

1. In a bicycle-holder, the combination with a support, of an arm pivoted at one end to said support to fold down on the same when not in use, and a recessed block pivotally mounted and adjustably secured to said arm, whereby the recessed block can be made to engage a bicycle-frame to hold it to the support when said arm is swung outward, substantially as described.

2. In a bicycle-holder, the combination with a vertical support provided with a recess to receive the tread of the wheels, of an arm pivoted at one end to said support to fold down on the same when not in use and a recessed block pivotally mounted and adjustably secured to said arm, whereby when the arm is swung outward from the support the recessed block can be engaged with a bicycle-frame to hold it against the said support and above the floor of the building or car, substantially as described.

3. In a bicycle-holder, the combination with a support provided with a recess to receive the tread of the wheels, of a longitudinally-slotted arm pivoted to the support to fold down on the same when not in use, a recessed block, and a bolt upon which the block is pivotally mounted, said bolt serving to secure the block to the arm, substantially as described.

4. A bicycle-holder, comprising strips spaced apart to receive between them the wheel-treads of a bicycle, an arm hinged adjustably to one strip and arranged to fold against the same, and a pivoted block adjustably mounted on the arm and arranged to engage the frame of a bicycle to be supported, substantially as set forth.

5. In a bicycle-holder, the combination of a car-wall or the like having vertical strips secured to it and spaced apart to form between them a recess to engage the wheel-treads of a bicycle, an arm hinged adjacent to the strips, and a block adjustably carried on the arm and arranged to engage the frame of a bicycle to be supported, substantially as set forth.

CHARLES B. DURFEE.
FRANK M. WILLIAMS.

Witnesses:
FRANK E. WRIGHT,
WILL D. POWERS.